US012577754B1

(12) United States Patent
Wuisan et al.

(10) Patent No.: US 12,577,754 B1
(45) Date of Patent: Mar. 17, 2026

(54) DUAL MODE JOYSTICK AND WORK VEHICLES CONTAINING THE SAME

(71) Applicant: Deere & Company, Moline, IL (US)

(72) Inventors: Giovanni A Wuisan, Epworth, IA (US); Ronald J. Huber, Denver, IA (US); Scott J. Breiner, Dubuque, IA (US); Douglas M. Van Meter, Cordova, IL (US); Jonathan E. Drum, Raleigh, NC (US); Kevin A Wolff, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 19/178,090

(22) Filed: Apr. 14, 2025

(51) Int. Cl.
*E02F 9/20* (2006.01)
*G05G 9/047* (2006.01)

(52) U.S. Cl.
CPC .......... *E02F 9/2004* (2013.01); *G05G 9/047* (2013.01); *G05G 2009/04703* (2013.01)

(58) Field of Classification Search
CPC .................. E02F 9/2004; G05G 9/047; G05G 2009/04703
See application file for complete search history.

(56) References Cited

U.S. PATENT DOCUMENTS

| | | | | |
|---|---|---|---|---|
| 5,850,759 | A * | 12/1998 | Kim | G05G 9/04737 901/34 |
| 9,383,000 | B2 * | 7/2016 | Tippelhofer | B60Q 3/283 |
| 10,377,458 | B1 * | 8/2019 | McGinley | G05D 1/0206 |
| 10,394,272 | B1 * | 8/2019 | Leckenby | G05G 25/04 |
| 10,770,247 | B1 * | 9/2020 | Wu | H01H 23/04 |
| 11,068,015 | B2 | 7/2021 | Ofenloch et al. | |
| 11,906,040 | B2 * | 2/2024 | Isami | F16H 59/044 |
| 2001/0002127 | A1 * | 5/2001 | Cheng | G05G 9/047 345/161 |
| 2002/0005833 | A1 * | 1/2002 | Furukawa | G05G 9/047 345/161 |
| 2004/0090418 | A1 * | 5/2004 | Ceremony | G05G 9/04792 345/161 |
| 2005/0156877 | A1 * | 7/2005 | Schaeffer | G05G 9/04737 606/130 |

(Continued)

FOREIGN PATENT DOCUMENTS

| | | | |
|---|---|---|---|
| DE | 102012104098 | A1 | 11/2013 |
| DE | 102017110472 | A1 | 11/2018 |

*Primary Examiner* — Paul N Dickson
*Assistant Examiner* — Shams Dhanani
(74) *Attorney, Agent, or Firm* — William E. Sekyi; Lucian Wayne Beavers; Patterson Intellectual Property Law, PC

(57) ABSTRACT

A variable track joystick device includes a joystick movably coupled to a support housing, the joystick having a first range of motion to control a first work vehicle function when the device is in a first mode of operation, and a second range of motion to control a second work vehicle function when the device is in a second mode of operation. In the first mode, an actuator can be powered to move a joystick guide to a closed position to restrict the joystick to the first range of motion or unpowered in the second mode to move the joystick guide to an open position for a second range of motion. An operator can command the device from the first mode to the second mode by pushing the joystick from the first range of motion to the second range of motion even when the actuator remains powered.

17 Claims, 9 Drawing Sheets

(56) References Cited

U.S. PATENT DOCUMENTS

| | | | | |
|---|---|---|---|---|
| 2005/0195166 | A1* | 9/2005 | Cooper | G06F 3/038 345/161 |
| 2007/0062788 | A1* | 3/2007 | Kakuno | H01H 25/04 200/6 A |
| 2008/0148894 | A1* | 6/2008 | Rapin | G05G 5/06 74/473.21 |
| 2008/0184836 | A1* | 8/2008 | Riwan | G05G 9/04737 74/471 XY |
| 2009/0084214 | A1* | 4/2009 | Sakai | A43C 15/04 74/471 XY |
| 2009/0295724 | A1* | 12/2009 | Cheng | G05G 9/047 345/161 |
| 2014/0123803 | A1* | 5/2014 | Yamada | F16H 61/22 74/527 |
| 2015/0020630 | A1* | 1/2015 | Mueller | G05G 1/04 74/471 XY |
| 2015/0318128 | A1* | 11/2015 | Noh | G05G 9/04792 200/4 |
| 2018/0004310 | A1* | 1/2018 | Drum | G06F 3/0354 |
| 2019/0345690 | A1* | 11/2019 | Graham | G05G 9/04737 |
| 2019/0359257 | A1* | 11/2019 | Johnson | B60K 35/60 |

* cited by examiner

DUAL MODE JOYSTICK AND WORK VEHICLES CONTAINING THE SAME

FIELD OF THE DISCLOSURE

This disclosure relates to variable track joystick devices for usage in controlling multiple functions of a work vehicle, such as a tractor.

BACKGROUND

As shown in FIG. 10 multipurpose work vehicles can include multiple input devices that an operator can manipulate to operate various work vehicle functions. For example, a tractor with a hydraulically actuated loader bucket attached at its front end can include a steering wheel 1002, pedals and levers 1004 for driving functions, a driving joystick that operates the vehicle transmission for fine movement of the tractor, a front end loader joystick for operating the bucket, a control panel 1012 for controlling engine throttle and accessories, and a touchscreen 1006 for inputting various tractor settings. Thus, certain work vehicles are equipped with multiple joystick devices. In these work vehicles, each joystick device can be used to control a different function of the work vehicle. Typically, these joystick devices include a joystick, which is a handle movably attached to a support that an operator manipulates to control the operation of a machine. Such joystick devices may differ not only in form and function but can also have joystick handles restricted to move with different ranges of motion ("ROMs").

Consider, for example, a tractor equipped with a joystick-controlled front end loader ("FEL") system or assembly. Two joystick devices could be located within the operator station or cabin 1000 of such an FEL-equipped tractor: a first joystick device 1008 utilized to control the tractor's transmission, and a second joystick device 1010 utilized to control FEL movement. The first (transmission-dedicated) joystick device 1008, for example, may adjust the speed and direction in which the tractor travels and may be adapted to facilitate fine control of vehicle movement when in working mode. The second (FEL-dedicated) joystick device 1010 may control the height and tilt angle of the FEL bucket. Other types of work vehicles were likewise equipped with multiple joystick devices for controlling different work vehicle functions, such as the movement of boom-mounted implements for performing various tasks in the agricultural, mining, forestry, and construction industries. To control different functions on different work vehicles, joystick devices could, for example, include different buttons or input devices. In addition, the ROM of the joystick included in a particular joystick device could vary in relation to the work vehicle function controlled utilizing the joystick device. Such multi-joystick control schemes were well-established within industries employing work vehicles and provided a certain level of simplicity by associating each joystick device with control of a specific work vehicle function.

However, the inclusion of multiple different joystick devices within a single work vehicle was associated with several drawbacks. The need to furnish two (or more) function-specific joystick devices, as well as their associated interconnections and supportive hardware, introduced additional manufacturing cost, part count, and complexity into the overall construction of a work vehicle operator station. Additionally, the provision of multiple joystick devices, each including a joystick handle within comfortable reach of a human operator when seated within the operator station of a work vehicle, could place undesired spatial constraints on the layout of the joystick devices and other components (e.g., a control panel 1012, touchscreen displays 1006, steering wheels 1002, levers 1004, and other input devices, etc.) within the operator station 1000. As a still further drawback, requiring an operator to repeatedly transition between manipulating different joystick devices when operating a work vehicle could distract the operator and lower performance levels.

In certain work vehicles, it became desirable to integrate functionality usually implemented in separate joystick devices into a single joystick device. Such integrated joystick devices could operate in different modes corresponding to the functionality and range of motion associated with each separate joystick device. include input devices through which such integrated joystick devices could receive operator commands setting the mode of operation. Alternatively, the integrated joystick device, or an associated operator interface, could use sensors and operator feedback to determine the appropriate mode of operation, as well as guides or actuators that restrict the range of motion based on mode. However, one problem with such integrated joystick devices was that in a case of a failure of some system in the work vehicle, an operator could lose the ability to change joystick device mode and control important work vehicle functions. For example, if a work vehicle system failure prevented the integrated joystick device from changing mode for FEL control when the work vehicle was travelling while carrying a raised load, such a loss of control would be inconvenient and could be dangerous. The work vehicle would be unable to lower the load to the ground and place the load in a position where repairs could be safely performed. Therefore, a need exists for safer and more convenient integrated joystick devices which can maintain more functionality during work vehicle failures.

SUMMARY OF THE DISCLOSURE

In some embodiments, the techniques described herein relate to a variable track joystick device for controlling at least first and second work vehicle functions. The variable track joystick device includes a support housing and a joystick having a lower joystick extension. The joystick is movably coupled to the support housing. A joystick guide can be coupled to the support housing and can be movable relative the lower joystick extension between a closed position and an open position. The closed position restricts joystick movement to a first range of motion relative to the joystick housing. The open position permits joystick movement within a second range of motion that extends outside the first range of motion. The variable track joystick device can also include an actuator configured to move the joystick guide, relative to the lower joystick extension, to the closed position when the actuator is powered and to the open position when the actuator is not powered. Further, the variable track joystick device can include a controller configured to; determine when the variable track joystick device is placed in a selected one of (i) a first mode in which joystick movement controls the first work vehicle function and (ii) a second mode in which joystick movement controls the second work vehicle function. The controller can be further configured to command the joystick guide to the closed position when the variable track joystick device is placed in the first mode, and to the open position when the variable track joystick device is placed in the second mode. In addition, the controller can be configured to provide power to the actuator when commanding the joystick guide to the closed position. wherein the joystick is configured to push the joystick guide from the closed position to the open position when the joystick moves from the first range of motion to the second range of motion when the first actuator is powered.

According to some aspects, the first work vehicle function can include a transmission control function, and the second work vehicle function can include an implement control function. The implement control function can include front end loader ("FEL") control. Optionally, the joystick guide includes a track pattern, and the lower joystick extension extends into the track pattern to restrict the joystick to the first range of motion when the joystick guide is in the closed position. The track pattern can include at least one linear track. When the joystick guide is in the open position, the lower joystick extension is clear of the track pattern and the joystick range of motion is unconstrained by the track pattern.

According to other aspects, the lower joystick extension can be configured to engage the joystick guide and shift the joystick guide from the closed position to the open position when the joystick moves from the first range of motion to the second range of motion. The joystick guide can be coupled to support housing via at least one guide spring that biases joystick guide in the open position when first actuator is not powered. Optionally, the actuator can apply a force not exceeding 8 ounces against the at least one guide spring to move joystick guide into the closed position. According to another option the first actuator can apply a force not exceeding 4 ounces against the at least one guide spring to move joystick guide into the closed position. As a further option, the joystick guide can be configured to shift from its closed position to its open position when the first actuator is not powered. The first actuator can include an electric solenoid.

According to further aspects of the variable track joystick device, the track pattern can include multiple intersecting tracks which each restrict joystick motion to at least one linear track whenever the joystick guide is in the closed position. Optionally, in this embodiment, the joystick is rotatable relative to the support housing about a first rotational axis and about a second rotational axis perpendicular to the first rotational axis. As a further option, whenever the joystick guide is in the closed position, the joystick guide can restrict joystick movement to a first linear track and at least a second linear track perpendicular to the first linear track. In some alternatives, the first linear track and the second linear track can intersect at a home position of the joystick.

According to yet other aspects, the variable track joystick device can further include a mode selection interface enabling an operator of the work vehicle to switch between the first and second modes. The controller can determine when the variable track joystick device is placed in a selected one of the first and second modes based, at least in part, on operator input received via the mode selection interface.

According to other embodiments, the variable track joystick device can control at least first and second work vehicle functions and can include a support housing and a joystick having a joystick base coupled to the support housing. The joystick can further include a guide pin that extends from the joystick base. A joystick guide having a track pattern can be coupled to the support housing and can be movable to a closed position in which guide pin extends into the track pattern to restrict joystick movement to a first range of motion. The joystick guide can also be movable to an open position in which guide pin is clear of the track pattern so that joystick is unconstrained and can move withing a second range of motion. A guide spring can be coupled between the joystick guide and the support housing and be configured to bias joystick guide towards its open position. The variable track joystick device can also include an actuator configured to move the joystick guide against the guide spring to its closed position when powered and configured to retract the joystick guide to its open position when not powered. The variable track joystick device can further include a controller configured to determine when the variable track joystick device is placed in a selected one of (i) a first mode in which joystick movement controls the first work vehicle function and (ii) a second mode in which joystick movement controls the second work vehicle function, command the joystick guide to the closed position when the variable track joystick device is placed in the first mode, to the open position when the variable track joystick device is placed in the second mode, and provide power to the actuator when commanding the joystick guide to the closed position.

Optionally in this embodiment, the actuator can apply a force not exceeding 8 ounces when moving the joystick guide against the guide spring to its closed position when powered. As a further option, the joystick can be configured to move the joystick guide from its closed position to its open position by pushing guide pin against track pattern when the joystick is moved from the first range of motion to the second range of motion while the actuator is powered.

In yet further embodiments, a work vehicle can include a transmission, a work implement, and a variable track joystick device. The variable track joystick device can include a support housing and a joystick having a lower joystick extension, the joystick being movable within a first range of motion and within a second range of motion with respect to the support housing. A joystick guide can be coupled to the support housing and movable relative to the lower joystick extension between a closed position, which restricts joystick movement to a predetermined track pattern, and an open position, which permits joystick movement outside of the predetermined track pattern. The variable track joystick device can additionally include an actuator configured to move the joystick guide, relative to the lower joystick extension, to a closed position when powered, and configured to move the joystick guide relative to the lower joystick extension to an open position when not powered. The variable track joystick device can still further include a controller configured to determine when the variable track joystick guide is placed in a selected one of (i) a first mode in which joystick movement controls a first work vehicle function and (ii) a second mode in which joystick movement controls a second work vehicle function, command the joystick guide to the closed position when the variable track joystick is placed in the first mode, and to the open position when the variable track joystick is placed in the second mode, and provide power to the actuator when commanding the joystick guide to the closed position. According to a further aspect of this embodiment, the joystick can be configured to move the joystick guide from its closed position to its open position when the joystick moves from the first range of motion to the second range of motion and the first actuator is powered.

Optionally, in this embodiment, the joystick guide can restrict joystick movement to multiple intersecting linear tracks when confining joystick movement to the predetermined track pattern. Additionally, the work implement can include a front end loader bucket, and the work implement control mode can include front end loader control.

BRIEF DESCRIPTION OF THE DRAWINGS

At least one example of the present disclosure will hereinafter be described in conjunction with the following figures.

DETAILED DESCRIPTION

Figure 1:
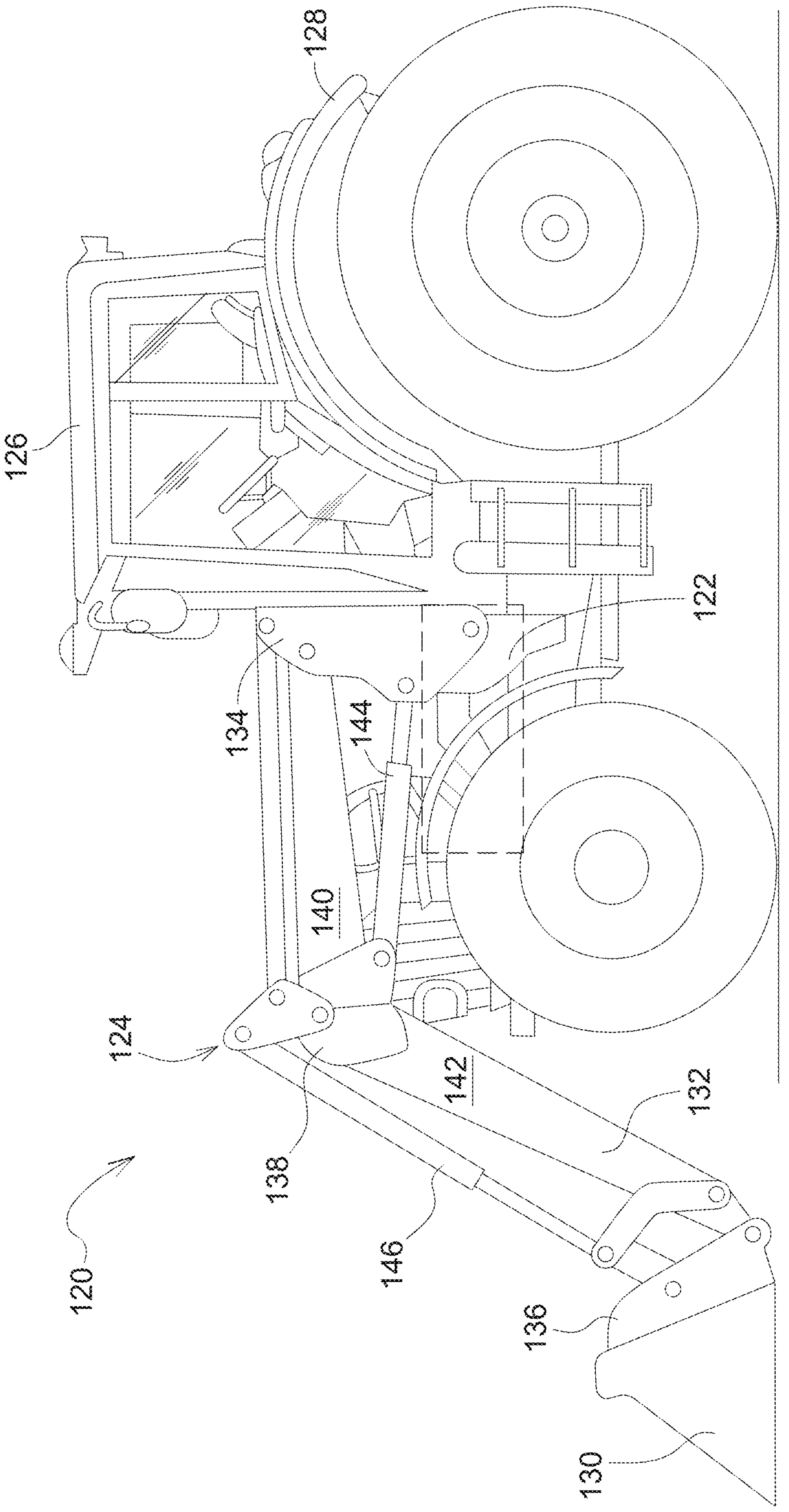
FIG. 1 is a side view of an example work vehicle (here, a tractor) having multiple functions suitably controlled utilizing an embodiment of a variable track joystick device.

Embodiments of the present disclosure are shown in the accompanying figures of the drawings described briefly above. Various modifications to the example embodiments may be contemplated by one of skill in the art without departing from the scope of the present invention, as set-forth the appended claims.

To overcome some of the limitations and problems of known joystick devices as set forth above, the following describes various embodiments of an integrated joystick device and method suitable for use in a work vehicle such as a front end loader ("FEL"). Such work vehicles can include multiple systems, such as a transmission system for propelling the machine along a ground surface, and an implement system for controlling the movement and operation of work tools coupled to the work machine frame. The integrated joystick device can include a mode selection interface, or input device, for switching the joystick device between different modes of operation. Each mode can correspond to a different joystick ROM and different work vehicle functions that the joystick device controls. In this regard, using the mode selection interface an operator can switch the joystick device to a first mode of operation which limits joystick movement to at least one predetermined track pattern (herein, a "first fixed-track pattern"). In this first mode, joystick movement controls a first function of the work vehicle. Using the mode selection interface, the operator can switch the joystick device to a second mode of operation which may permit joystick movement outside of the first fixed-track pattern and correspondingly control a second function of the work vehicle. In case of a system failure that disables the mode selection interface's ability to switch between the first and second modes, the joystick can include one or more failsafe mechanisms that enable an operator to switch between ROMs, and to switch between joystick device modes of operation without using the mode selection interface.

The term "controls," as appearing in this context, does not require that a particular work vehicle function is wholly controlled by joystick movement, rather only that an operator may move the joystick movement to adjust at least one operational aspect of the work vehicle function, as desired. The term "controls" is thus defined to encompass the term "help control" throughout this document. When placed in the second mode, the joystick device may permit movement over the full ROM permitted by the coupling formed between the joystick and a support housing of the joystick device; or, alternatively, may limit joystick movement in a different manner, such as by confining joystick movement to a second fixed-track pattern. As the joystick device selectively confines joystick movement to at least one fixed-track pattern based on the operational mode, the joystick device is referred to more fully herein as a "variable track joystick device." Further, in certain embodiments, the joystick device may be operable in three or more modes, may be capable of selecting confining joystick movement to any practical number of fixed-track patterns in addition to in lieu of selectively allowing joystick movement over a full or open ROM in at least one operational mode.

Depending upon design, the fixed-track pattern (or patterns) to which the joystick device selectively limits joystick movement can include any number of tracks in which the joystick may travel when manipulated by an operator. For example, in embodiments, the fixed-track pattern may include at least two intersecting tracks, each having a linear or curved geometry. As a more specific example, the fixed-track pattern may include or consist of two linear tracks, which intersect at a right angle to form a plus-shaped or cruciform pattern. The linear tracks may intersect at a centered or home position of the joystick, toward which the joystick may be biased utilizing, for example, one or more springs. In other embodiments, the fixed-track pattern may include one or more tracks having a more complex geometry, such as a stepped or sawtooth geometry. Depending upon the width of a given track, joystick movement may be confined to substantially bi-directional movement along the length or centerline of the track in some implementations. Comparatively, when joystick movement is permitted over an open, maximum, or full ROM, the joystick may be moved in multiple DOFs regardless of joystick position, limited only by the coupling provided between the joystick and the support housing.

The work vehicle functions controlled utilizing the variable track joystick device will vary between embodiments depending upon a number of factors including, for example, the type of work vehicle into which the joystick device is incorporated. To provide a useful, albeit non-limiting example, the following will principally discuss embodiments of the variable track joystick device in the context of a tractor equipped with a forward, boom-mounted work implement, namely, an FEL bucket. In this instance, and as described below, the variable track joystick device may be utilized to control: (i) functional aspects of the tractor's transmission when the joystick device is placed in a first mode and joystick movement is confined to a fixed-track pattern; and (ii) movement of the FEL bucket when the joystick device is placed in a second mode in which joystick movement is permitted outside of (beyond the bounds of) the fixed-track pattern. The following example notwithstanding, embodiments of the variable track joystick device are not restricted to deployment within any particular type of work vehicle; nor are embodiments of the variable track joystick device restricted to usage in controlling any particular set of work vehicle functions. Rather, embodiments of the variable track joystick device can be utilized to control a wide range of work vehicle functions amenable to joystick control including, but not limited to movement of other types of boom-mounted work implements, such as the felling head of a feller buncher, the bucket (or other end effector) of an excavator, the blade of a dozer, or another attachment (e.g., a bale spear) mounted to the front end or rear end of a tractor, to list but a few examples.

FIG. 1 is a side view of a work vehicle (here, a tractor 120) having at least two joystick-controlled work vehicle functions and illustrated in accordance with an example embodiment of the present disclosure. As appearing herein, the term "joystick-controlled function" refers to a functionality or operational aspect of a work vehicle controlled, at least in part, by movement of a joystick included in a joystick device. In the present example, the joystick-controlled functions of the tractor 120 include at least: (i) control of certain operational aspects of a transmission contained in the tractor 120 and generically represented by dashed box 122 in FIG. 1, and (ii) control of certain operational aspects of an FEL system 124 mounted to the front end of the tractor 120. Traditionally, such joystick-controlled functions are controlled utilizing a first joystick device dedicated to controlling the tractor transmission and a second, independent joystick device dedicated to controlling FEL movement. However, in accordance with embodiments of the present disclosure, both of the foregoing work vehicle functions are controlled, at least in part, utilizing a common variable track joystick device, i.e., an integrated joystick device, as described more fully below.

Discussing the tractor 120 in greater detail, the example tractor 120 includes an operator station 126, such as an environmentally sealed cabin, located above a wheeled vehicle chassis or tractor body 128. A work implement 130, as included in the FEL system 124, is mounted to a forward portion of the tractor body 128 by a boom assembly 132 further included in the FEL system 124. In the illustrated example, the work implement 130 assumes the form of a bucket and is consequently referred to as hereafter as the "FEL bucket 130." The present example notwithstanding, the FEL bucket 130 can be replaced by a different type of work implement, such as a forklift implement or a bale spear, in alternative embodiments of the tractor 120. Furthermore, in alternative embodiments, a second type of work implement can be mounted to the rear of the tractor 120, such as a backhoe, and potentially also controlled utilizing the below-described variable track joystick device.

In the example of FIG. 1, the boom assembly 132 includes an aft bracket 134 affixed to the tractor body 128, a forward bracket 136 to which the work implement 130 is pivotally attached, and an intermediate or mid bracket 138 between the brackets 134, 136. Twin lift arms 140 (one of which can be seen in FIG. 1) pivotally attach the aft bracket 134 to the mid bracket 138, which is, in turn, attached to the forward bracket 136 by twin bucket arms 142 (again only one of which can be seen). Twin hydraulic lift cylinders 144 are further mounted between the aft bracket 134 and the mid bracket 138, while twin hydraulic bucket cylinders 146 are mounted between the mid bracket 138 and the forward bracket 136. When the FEL system 124 is mounted to the front end of the tractor body 128, non-illustrated hydraulic lines of the FEL system 124 are fluidly connected to a pressurized hydraulic fluid supply on the tractor 120 in a manner permitting an operator seated within the operator station 126 to control the hydraulic cylinders 144, 146.

An operator can command the boom assembly 132 to lift the FEL bucket 130 by controlling the hydraulic lift cylinders 144 to extend. As the hydraulic lift cylinders 144 extend, the FEL bucket 130 is lifted from the ground position shown in FIG. 1, travels through an intermediate or mast level position, and is raised to a full height position. Similarly, as the hydraulic bucket cylinders 146 retract in response to operator commands, the boom assembly 132 tilts the FEL bucket 130 from the forward-facing open or scoop position (shown in FIG. 1), through an intermediate position, and to the upright position. Conversely, from the full height position, the operator can control the boom assembly 132 to stroke the hydraulic cylinders 144, 146 in a manner opposite that just described to return the FEL bucket 130 to the grounded, scoop position shown in FIG. 1. The operator may control the cylinders 144, 146 to extend and retract, as desired, through movement of a joystick included in a variable track joystick device located within the operator station 126 of the tractor 120, as further discussed below in connection with FIG. 2.

Figure 2:
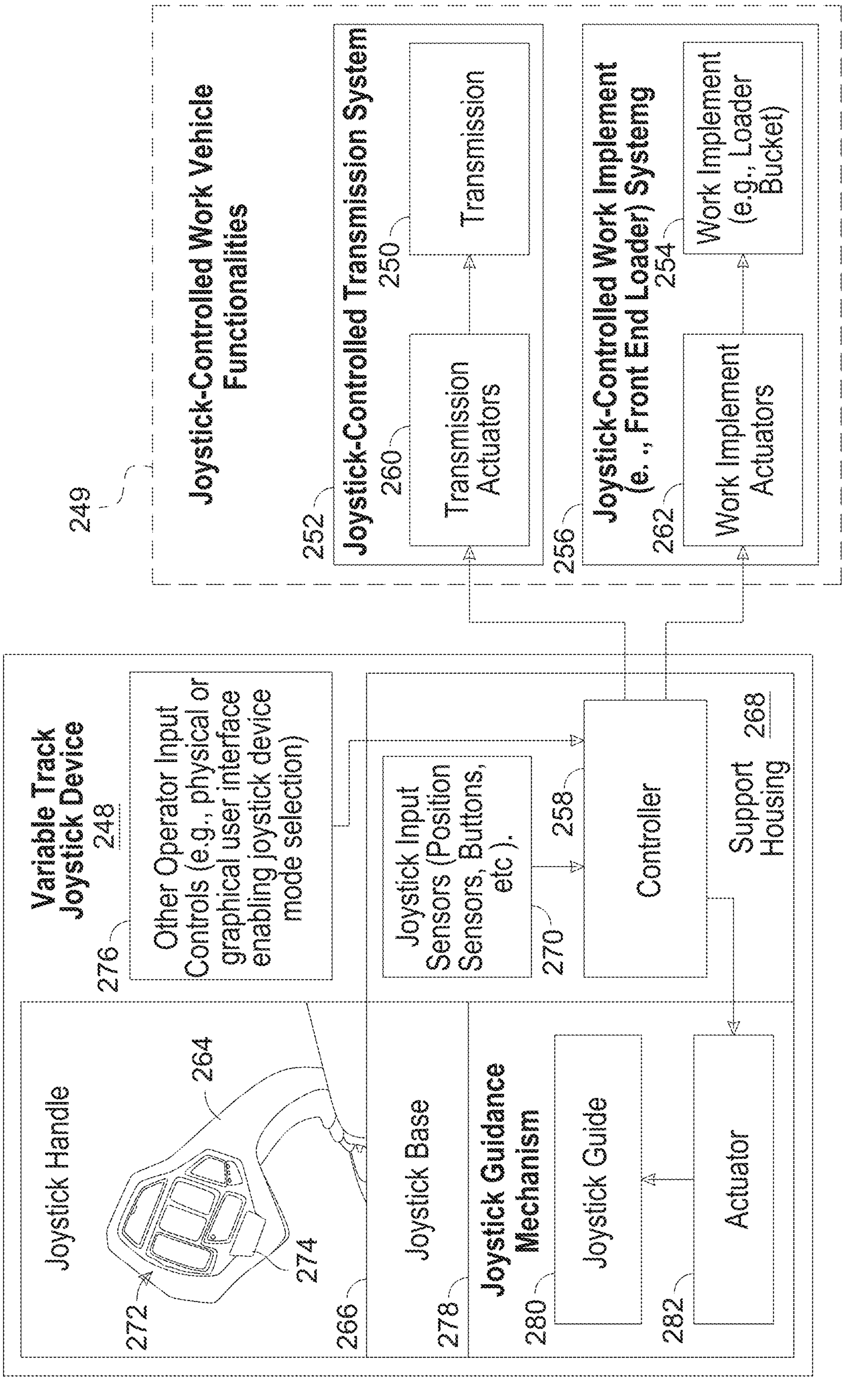
FIG. 2 is a schematic of an example variable track joystick device and a work vehicle system for controlling two functions of the work vehicle shown in FIG. 1 using the variable track joystick device.

Turning to FIG. 2, a number of the components or systems suitably included in the tractor 120 and controlled utilizing a variable track joystick device 248 are schematically presented, as illustrated in accordance with an embodiment of the present disclosure. As shown on the right side of this drawing figure, the work vehicle functions 249 controlled utilizing the example variable track joystick device 248 may include: (i) functioning of a work vehicle transmission 250 contained in a joystick-controlled transmission system 252, and (ii) movement of a work implement 254 contained in a joystick-controlled work implement system 256. Correlating FIG. 2 with FIG. 1, the work vehicle transmission 250 shown in FIG. 2 may correspond to dashed box 122 in FIG. 1, while the work implement 254 and the joystick-controlled work implement system 256 shown in FIG. 2 correspond to the FEL bucket 130 and the FEL system 124 shown in FIG. 1, respectively.

Among other components, the variable track joystick device 248 includes at least one processor or controller 258. Controller 258 implements or effectuates operator commands by transmitting corresponding signals to actuators, such as control valves or electric actuators, included in the systems controlled utilizing the variable track joystick device 248. Thus, in the example of FIG. 2, controller 258 may transmit signals to any number of actuators 260 contained in the transmission system 252 to effectuate operator commands received via the variable track joystick device 248. Similarly, controller 258 likewise transmits commands signals to any number of actuators 262 contained in the work implement system 256 to effectuate operator commands when received via the variable track joystick device 248. The signals transmitted to the actuators 260, 262 can be hydraulic, pneumatic, or electric (wired or wireless) in nature, depending upon actuator type. For example, in the case of the FEL system 124 (FIG. 1), the controller 258 may transmit electrical signals to valve controllers, which, in turn, vary hydraulic fluid flow to the hydraulic cylinders 144, 146 (corresponding to the actuators 262 in FIG. 2) to implement operator input commands received via the variable track joystick device 248. Various other control schemes are also possible, with the embodiment of FIG. 2 merely serving as one generalized example.

While represented in FIG. 2 by a single box and referred to as a "controller" for convenience of reference, the controller 258 can include one or more processors and other components, such as printed circuit boards and memory structures, which collectively perform the signal processing and control functions described herein. Generally, then, the term "controller" broadly encompasses any number and type of processors, possibly in addition to other microelectronic components or logic structures, which are operably interconnected to provide the processing capabilities of the variable track joystick device 248. Controller 258 may also include memory containing computer-readable instructions and logic, as appropriate. Any such computer-readable instructions and logic may be realized in any combination of hardware, firmware, and software, potentially including software programs or applications directing the various hardware features of the variable track joystick device 248 to perform the functions described throughout this document when executed. Controller 258 may be contained within support housing 268, as generally indicated in schematic of FIG. 2. Alternatively, the controller 258 (and various other components of the variable track joystick device 248) can be situated outside of the support housing 268 in further embodiments of the variable track joystick device 248.

In addition to the controller 258, the variable track joystick device 248 further includes a joystick 302 (shown in FIG. 3), which is mounted to a support housing 268 for movement with respect thereto. Joystick 302 includes joystick handle 264 and a joystick base 266. Joystick handle 264 projects from the support housing 268 in, for example, a generally upward direction to allow an operator seated within operator station 126 of the tractor 120 (FIG. 1) to comfortably grasp and manipulate the handle portion of the joystick 302 when piloting the tractor 120. Joystick base 266 is fixedly joined to joystick handle 264 and located within support housing 268. Joystick base 266 is mounted to the support housing 268 by a coupling or joint, which permits movement of the joystick 302 in at least one and, preferably, multiple degrees of freedom ("DOF"). For example, joystick base 266 can be attached to pivot around two orthogonal axes. As just stated, joystick base 266 is rigidly joined to the joystick handle 264 such that the joystick base 266 and the joystick handle 264 move as a single unit or rigid body. In certain embodiments, portions of the joystick handle 264 and the joystick base 266 may be integrally formed as single piece. The construction of the variable track joystick device 248 is, however, largely inconsequential to the present disclosure, providing that the joystick 302 can be rotated or otherwise moved relative to the support housing 268 in one or more degrees of freedom, as discussed below.

Any number of joystick sensors 270 may be included in the variable track joystick device 248, distributed through the support housing 268, and coupled in signal communication with the controller 258. Certain ones of the sensors joystick 270 are utilized to monitor movement of joystick 302 relative to the support housing 268 and, therefore, relative to a spatial frame of reference fixed relative to the operator station 126 of tractor 120 (FIG. 1). Various optical and non-optical sensors or transformers can be utilized for this purpose. Joystick sensors 270 of variable track joystick device 248 may further include any number and type of physical inputs present on the joystick handle 264, on the exterior of the support housing 268, or on any other operator-accessible surface of the variable track joystick device 248. In many instances, such additional joystick sensors 270 will include one or more buttons, switches, dials, or the like, which can be selected or otherwise manipulated by an operator when utilized the variable track joystick device 248 to further control the work vehicle functions 249 or, perhaps, other non-joystick-controlled functions of the tractor 120. Examples of such additional joystick sensors 270 are shown in the upper left corner of FIG. 2 as a button cluster 272 positioned for convenient engagement by an operator's thumb when grasping the joystick handle 264.

When present on the exterior of the joystick handle 264, or possibly on another surface of the joystick device 248, the button cluster 272 may include a button 274 for switching between the operational modes of the variable track joystick device 248; e.g., in the present example, for switching between the below-described transmission control mode and the FEL control mode of the joystick device 248. In other instances, a different mechanism may be provided for switching between operational modes of the variable track joystick device 248 in addition to or in lieu of the physical button 274. For example, the variable track joystick device 248 may further include one or more input devices 276 separate and apart from the joystick input sensors 270, which enable an operator to switch between the operational modes of the joystick device 248. In this latter case, the other operator input controls 276 may be physical in nature or, instead, may assume another form; e.g., a voice input interface or a graphical user interface (GUI) selection option presented on a non-illustrated display screen. In the latter regard, an operator of the tractor 120 may select the operational mode of the joystick device 248 by navigating through a GUI utilizing an appropriate input device (e.g., a cursor device or by touch input) and then selecting a widget controlling the mode selection. In this and other instances, the variable track joystick device 248 may normally operate in a default modality (e.g., the below-described transmission control modality) and transition to the second modality (or, perhaps, a still further modality) when selected via operator input. If desired, controller 258 may also be configured to return the variable track joystick device 248 to a default modality, such as the below-described transmission control modality, upon tractor shutdown or startup.

The example variable track joystick device 248 further contains a joystick guidance mechanism 278. As appearing herein, the term "joystick guidance mechanism" refers to any mechanism or device controllable to selectively limit or confine the ROM of a joystick in a predetermined manner; e.g., such that the desired confinement of the joystick movement to at least one predetermined track pattern can be applied and removed, as appropriate. In the illustrated example, the joystick guidance mechanism 278 includes one or more movable guides 280, which can be moved relative to the joystick base 266 by an actuator 282 to selectively restrict movement of joystick 302 within the support housing 268. In other instances, and as discussed below, the joystick guidance mechanism 278 may selectively confine joystick movement to one or more predetermined track patterns in a different manner; e.g., utilizing an electromagnetic joystick guidance scheme in which the controller 258 selectively energizes an array of electromagnets to confine movement of the joystick 302 to one or more fixed-track patterns (and, perhaps, other limited ROMs) when so desired.

Figure 3:
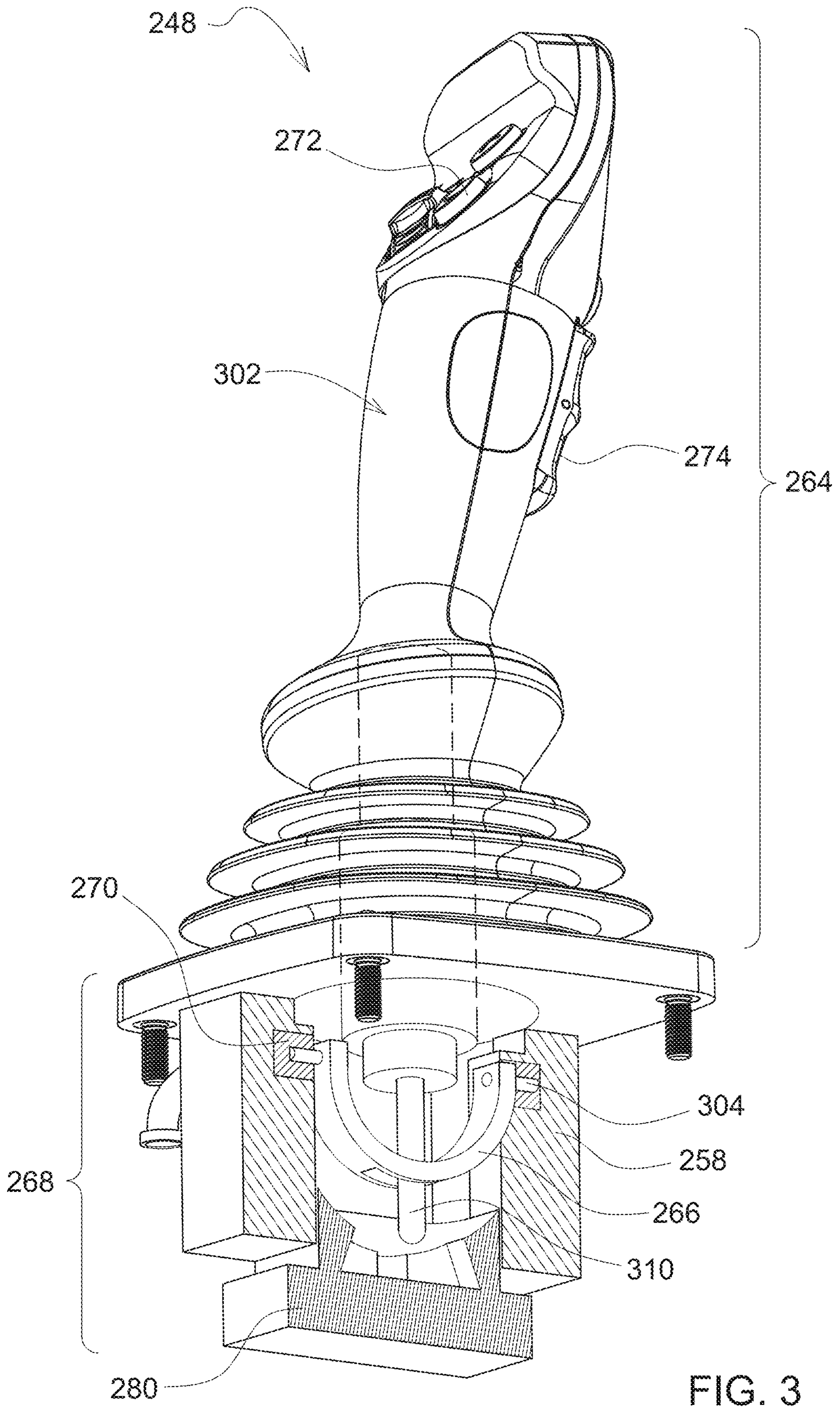
FIG. 3 is an isometric cutaway view of joystick device 248.
Figure 5:
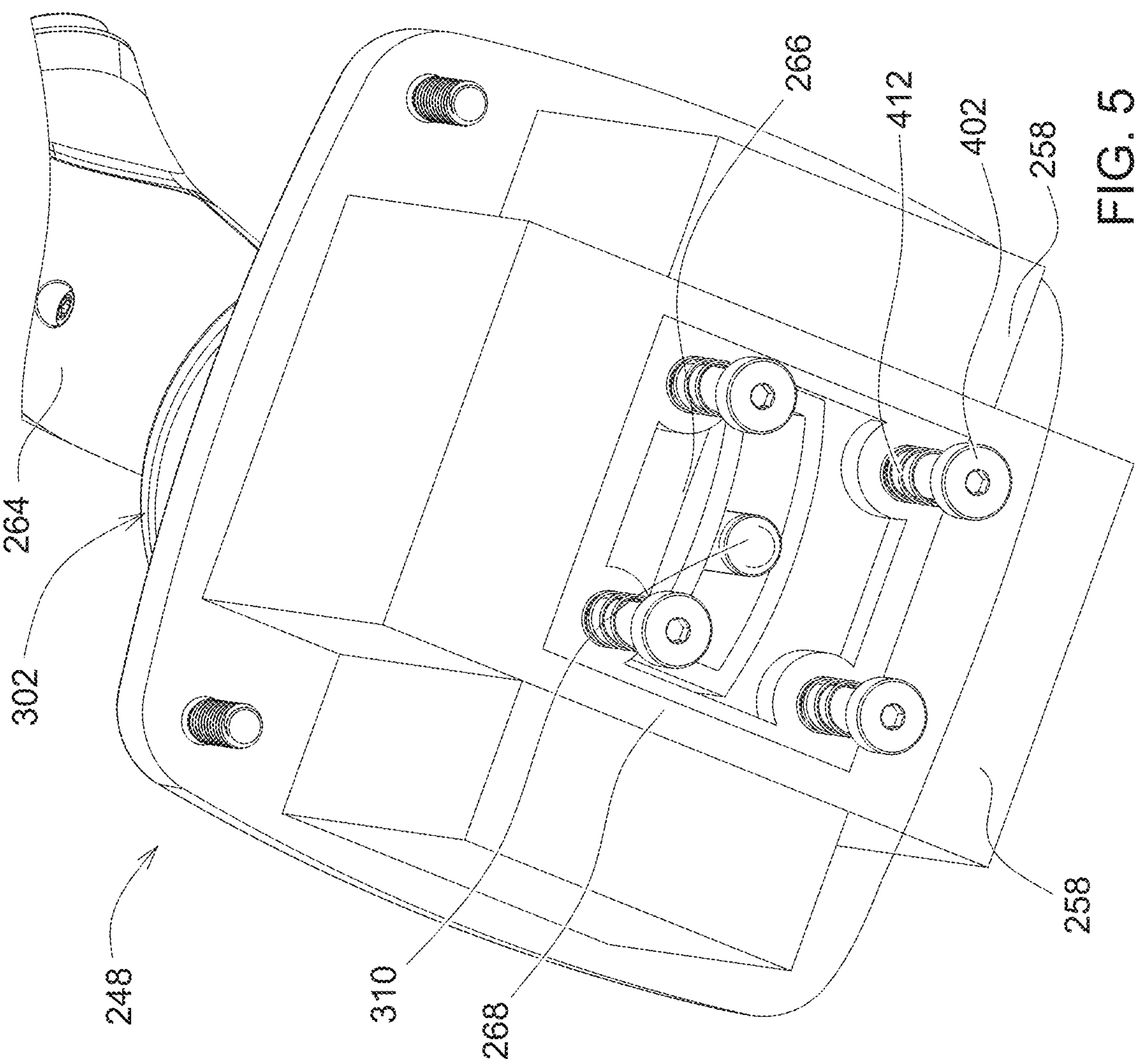
FIG. 5 is an isometric view of the variable track joystick device shown in FIG. 3 with the joystick guide hidden from view.
Figure 6B:
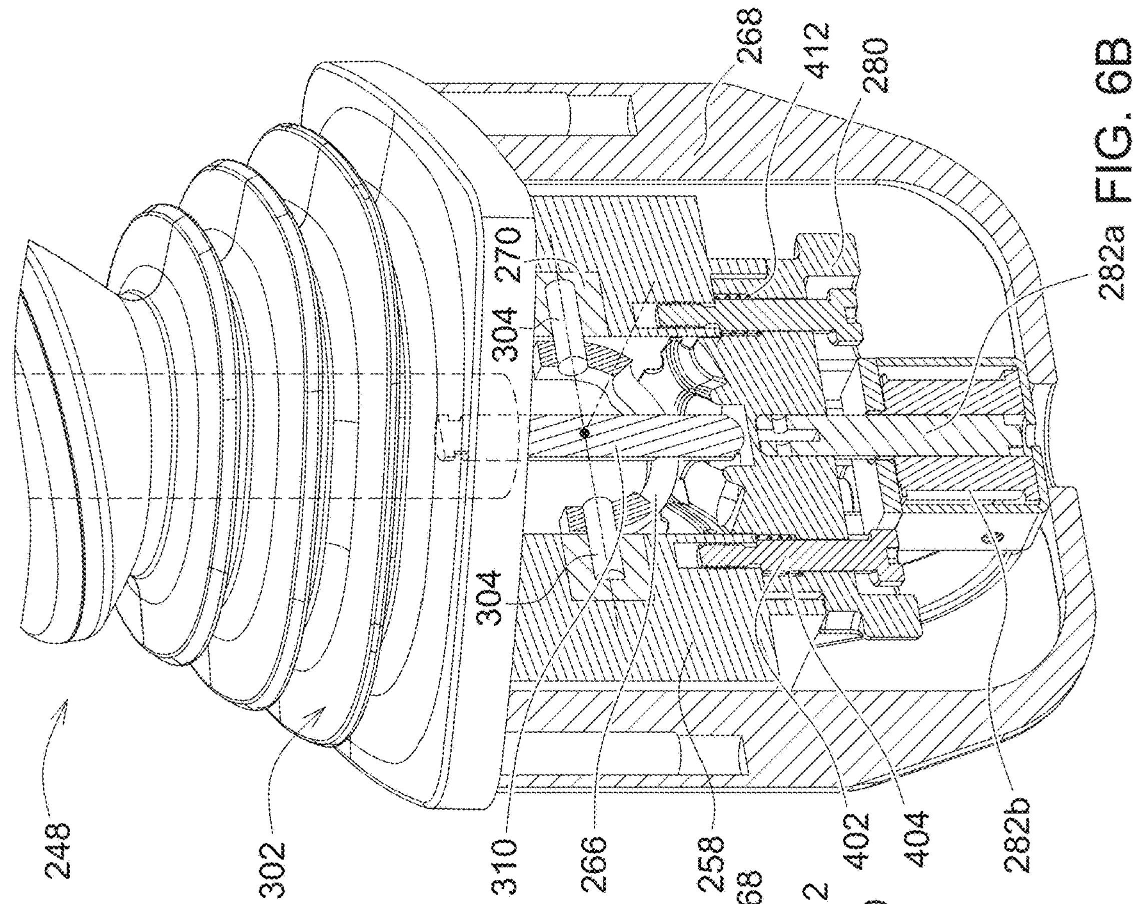
FIGS. 6A and 6B, are isometric views of the variable track joystick device showing the joystick guide and actuator in an open position and a closed position, respectively.
Figure 6A:
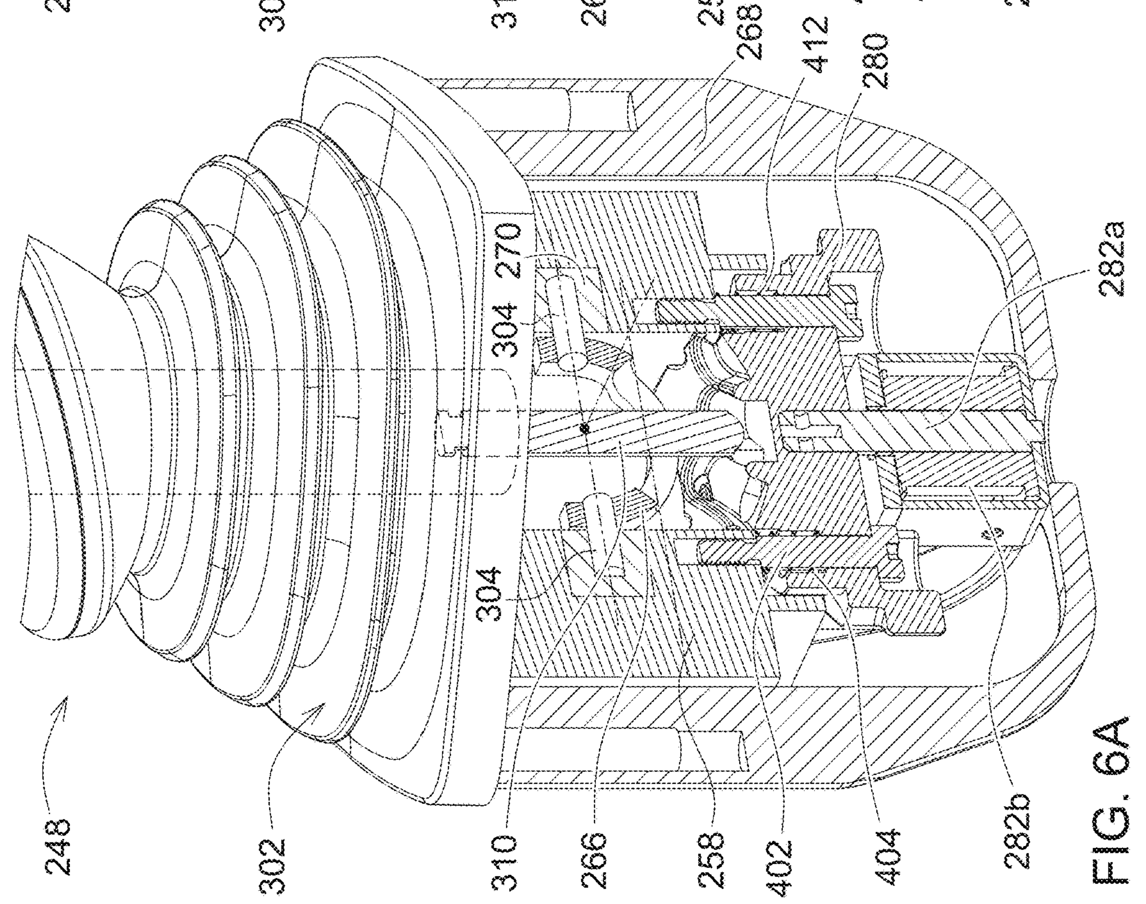
Figure 7B:
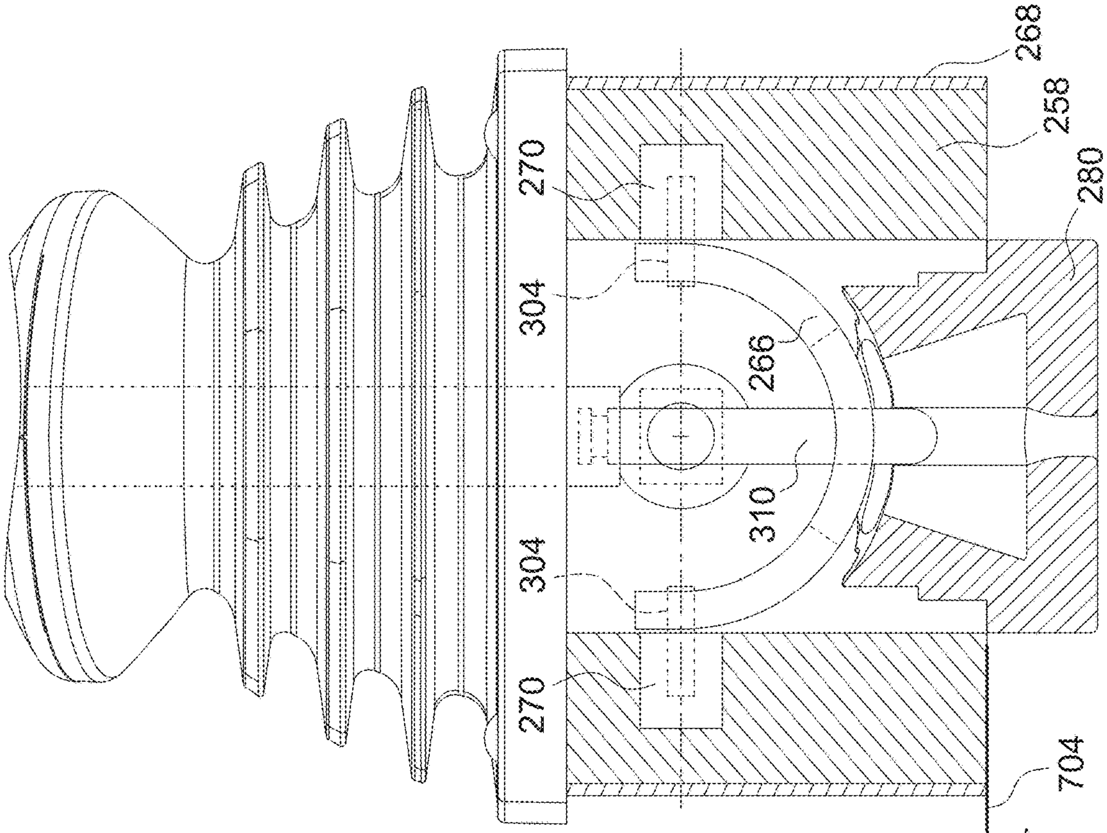
FIGS. 7A and 7B are cut-away side views of a lower portion of a variable track joystick device within a support housing showing, respectively, the joystick guide in an open position and in a closed position.

Progressing to FIGS. 3-7B, a simplified example implementation of the variable track joystick device 248 is presented, with like reference numerals carried over from FIG. 2 to FIGS. 3-7B (and the other drawing figures) for ease of reference. The implementation of the variable track joystick device 248 shown in FIGS. 3-7B is provided by way of non-limiting example only, again noting that the joystick device 248 is shown in a simplified form for purposes of explanation. FIG. 3 is an isometric cutaway view of joystick device 248. Joystick device 248 includes joystick 302 mounted for movement relative to support housing 268. The upper section of joystick 302 is joystick handle 264 which protrudes upwards from joystick housing 268. The lower section of joystick 302 is joystick base 266 which includes guide pin 310 (also identified herein as joystick extension) that extends from joystick base 266. Guide pin 310 is rigidly attached to joystick handle 264. Joystick base 266 can be attached to rotate around a first axis with at least a first pivot shaft 304 and, optionally, rotate around a second axis with a second pivot shaft (not shown) that is perpendicular to first pivot shaft 304. Each of first and second pivot shafts can be biased with centering springs that apply a centering force on joystick 302 tending to return joystick handle 264 and guide pin 310 to a neutral, centered position unless overwhelmed by force pushing the joystick handle 264 away from its centered position. Guide pin 310 can be rigidly attached to joystick handle 264 to protrude from joystick base 266 in a direction generally opposing joystick handle 264. An operator can manipulate joystick handle 264, to move joystick 302 anywhere within the envelope permitted by the combined rotation of first pivot shaft 304 and second pivot shaft unless movement of joystick 302 is constrained by joystick guide 280. The manipulation results in corresponding movement of guide pin 310. First pivot shaft 304 and second pivot shaft can be coupled to joystick sensor 270 which measures the rotation of the pivot shafts to monitor the position of joystick 302 and transmits corresponding command signals to controller 258.

Figure 4:
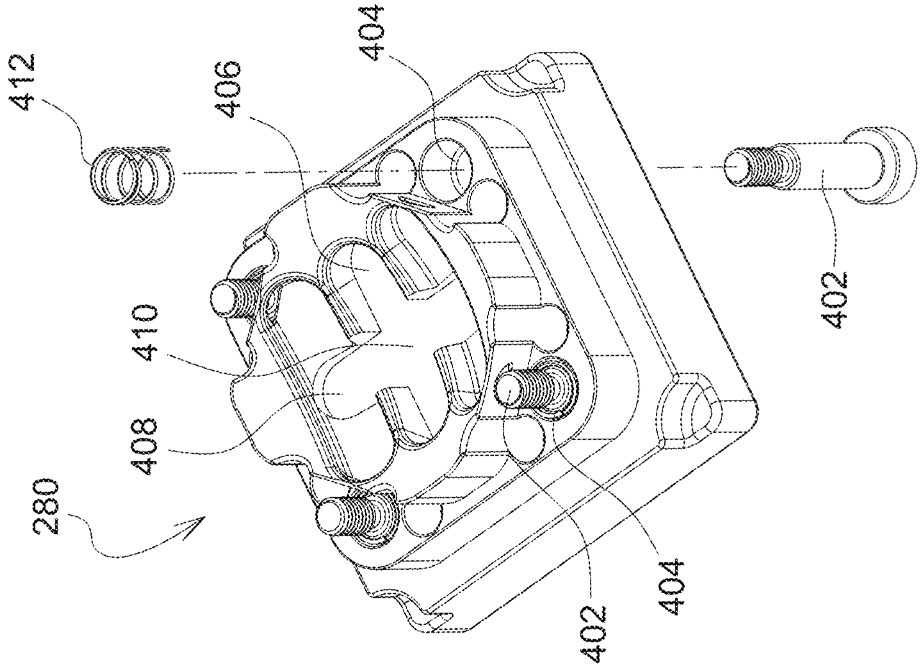
FIG. 4 is an isometric view of a joystick guide for a variable joystick device.
Figure 7A:
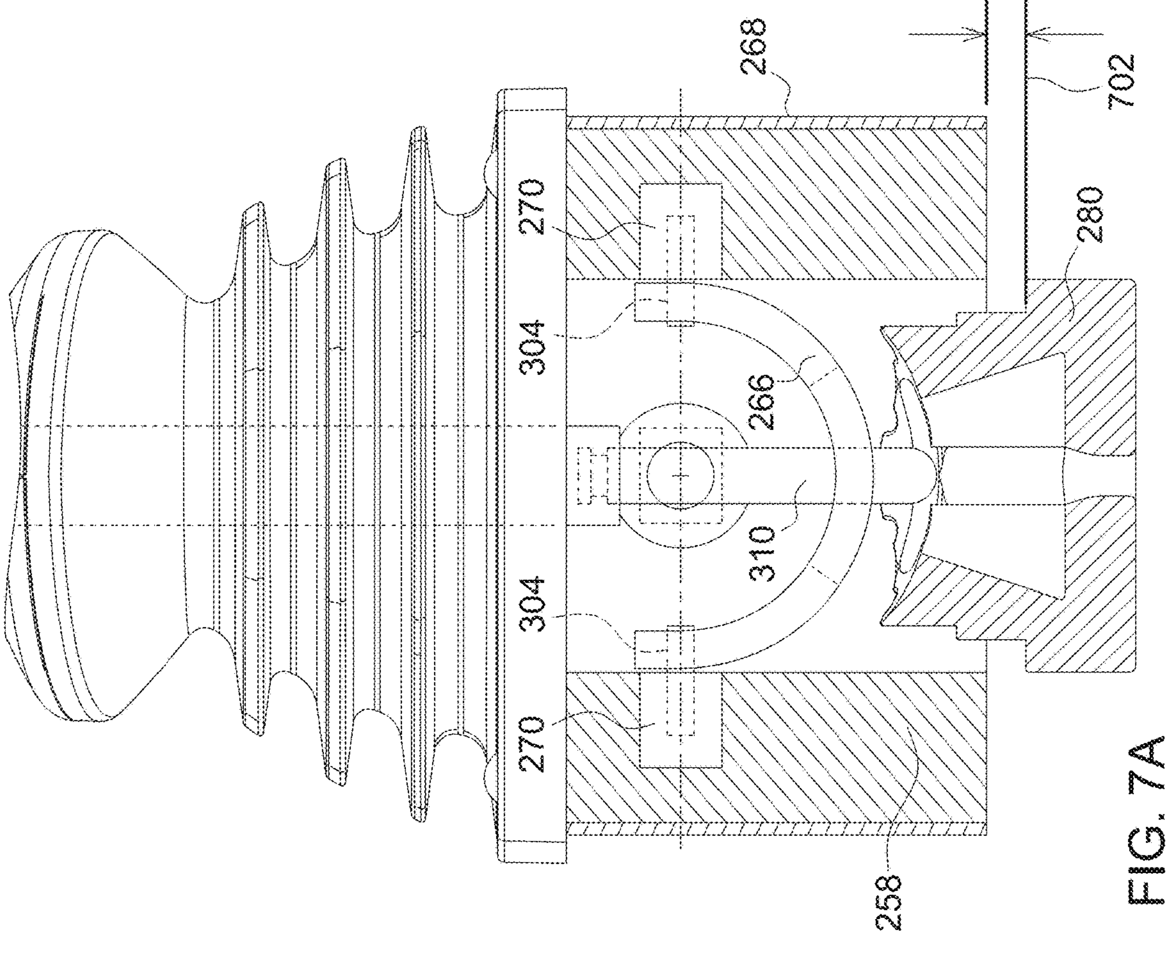

Variable track joystick device 248 can also include a joystick guide 280, which is movably coupled to support housing 268 to move to an upper, closed position or to move to a lower, open position. FIG. 4 is an isometric view of joystick guide 280 showing longitudinal linear tracks 406 which intersect transverse linear track 408 at a home or neutral position 410. Longitudinal linear tracks 406 and transverse linear track 408 are configured to receive guide pin 310, shown in FIG. 5, when joystick guide 280 is in a closed position. When joystick guide 280 is in the closed position, guide pin 310 extends into the longitudinal linear tracks 406 or the transverse linear track 408. Any motion of guide pin 310, and corresponding motion of joystick handle 264, is constrained to follow the tracks. With joystick guide 280 is raised into its closed position 704 (as shown in FIG. 7B), joystick 302 is constrained to move within a first ROM. When joystick guide 280 is lowered into its open position 702 (as shown in FIG. 7A), guide pin 310 is raised above the joystick guide tracks and is unconstrained. Thus, in the open position of joystick guide 280, joystick 302 is free to move in a second ROM that is not constrained by linear tracks 406, 408.

Using a mode selection interface, which can include one or more buttons 274 or separate input devices 276 for switching joystick device 248 between different operating modes, an operator can command joystick device 248 into a first operating mode or a second operating mode. The first operating mode can be, for example, a transmission control mode which controls the forward and reverse travel of tractor 120. In the first operating mode, the different commands needed for transmission control (for example, selection of forward or reverse travel speed ranges) may more conveniently be presented in the form of a fixed-track pattern that resembles the gear selector of a traditional manual shift truck gearbox. Accordingly, the tracks of joystick guide 280 can be designed restrict the movement of joystick handle 264 to a traditional gearbox shift pattern when in a closed position using. Thus, for this first mode of operation, controller 258 may raise joystick guide 280 into the closed position to engage the first ROM. Also in the first mode, controller 258 can be configured to interpret joystick position signals from joystick sensors 270 as transmission control signals. Controller 258 can use additional sensors or microswitches to monitor the position of joystick guide 280 to determine or confirm when the guide is in the closed position and to apply first mode algorithms for interpreting joystick position signals from joystick sensors 270. Accordingly, in response to signals from joystick sensors 270, in this mode, controller 258 operates transmission 250 by, for example, issuing commands to actuate one or more transmission actuators 260 to effect gear changes or to adjust transmission output speeds.

In the second operating mode, the different commands needed for FEL control such as, for example, raising and tilting the FEL bucket 130, may be more conveniently effected by displacing joystick handle 264 a variable distance from a neutral, central position. For example, the rate of raising or lowering FEL bucket 130 may be controlled by the longitudinal distance joystick handle is displaced backwards or forwards from its central, neutral position. Similarly, the rate of tilting FEL bucket 130 forwards or backwards may be controlled by the lateral distance joystick handle 264 is displaced leftwards or rightwards from its central neutral position. Varying degrees of the forwards/backwards and leftwards/rightwards displacement of joystick handle 264 would permit an operator to simultaneously control raising and tilting of FEL bucket 130. Such control may be more conveniently provided using the second ROM which permits full and unconstrained motion within the envelope permitted by the combined rotation of first pivot shaft 304 and second pivot shaft when joystick guide 280 is in its open position. Also in the second mode, controller 258 can be configured to interpret joystick position signals from joystick sensors 270 as FEL system control signals. Controller 258 can use additional sensors or microswitches to monitor the position of joystick guide 280 to determine or confirm when the guide is in the open position and to apply second mode algorithms for interpreting joystick position signals from joystick sensors 270. In response to signals from joystick sensors 270, in this second mode, controller 258 operates the joystick controlled work implement system by, for example, issuing commands to actuate one or more FEL work implement actuators 262, such as hydraulic cylinders 144, 146, to move FEL bucket 130.

Joystick guide 280 can be movably coupled to joystick housing 268 using retaining pins or bolts 402. As shown in FIGS. 4, 6A, 6B, the shaft of retaining pins 402 extend through holes in joystick guide 280 and attach to joystick housing 268. Joystick guide 280 can slide up and down along the shafts of retaining pins 402 between a lower open position and an upper closed position. The heads of each retaining pins 402 retains joystick guide 280 on each shaft. Each retaining pin includes a guide spring 412 which rests on spring seat 404 and pushes joystick guide 280 towards its lower, open position absent counteracting forces. As shown in FIG. 6A, actuator 282 is mounted below joystick guide 280. Actuator 282 can be an electrically powered solenoid with a spring mounted solenoid plunger 282*a* which extends when solenoid coil 282*b* is energized. Actuator 282 can include a plunger spring that returns plunger to its retracted position when solenoid coil is de-energized.

As noted above, an operator can place variable track joystick device 248 in the second mode of operation using mode selection interface. As shown in FIG. 6A, in the second mode, solenoid coil 282*b* is de-energized and plunger 282*a* is retracted. Guide spring 412 has pushed joystick guide 280 into its lower, open position. With the joystick guide 280 in this position, the lower end of guide pin 310 is clear of longitudinal linear tracks 406 and transverse linear track 408 and is free to move anywhere within the full envelope of the permitted by the rotation of the pivot shafts. The corresponding motion of joystick handle 264 permitted by this unrestricted motion of guide pin 310 represents the second ROM in which an operator can manipulate joystick handle 264. Guide springs 412 should be selected to be sufficiently strong to push joystick guide 280 down to its open position even when binding between joystick guide 280 and retaining pins 402 or between joystick guide 280 and guide pin 310 prevents joystick guide 280 from dropping to the open position under its own weight.

An operator can similarly place variable track joystick device 248 in the first mode of operation using mode selection interface. In this mode, solenoid coil 282*b* is energized, as shown in FIG. 6B, and plunger 282*a* extends to overcome the force of guide springs 412 to push joystick guide 280 to its upper, closed position. Preferably, the force plunger 282*a* exerts to overcome the force of guide springs 412 is not more than about 60N at middle knuckle position. In this position, guide pin 310 extends into one of longitudinal linear tracks 406 and transverse linear track 408 and is restricted to move within these tracks. Thus, when manipulating joystick handle 264 with joystick guide 280 in its closed position, an operator is restricted to move joystick handle in a pattern corresponding to the pattern of tracks guide pin 310 follows.

In case of a work vehicle fault that disables mode selection interface and results in the loss of electrical power to solenoid coil 282*b*, plunger 282*a* automatically retracts under the force of the plunger spring and guide springs 412. Absent the larger extending force that solenoid coil 282*b* produces in solenoid plunger 282*a*, guide springs 412 push joystick guide 280 to its open position. Controller 258 determines from its sensors that joystick guide 280 in its open position and engages second mode algorithms for interpreting joystick position signals from joystick sensors 270. With variable track joystick device 248 configured to control FEL work implements, an operator retains sufficient control of the work vehicle to lower work implements 130 or otherwise move them into a safe position, to permit safe repair of any faults in work vehicle 120.

Faults may also occur in work vehicle 120 that disables mode selection interface where supply of electrical power to solenoid coil 282*b* is maintained. With such faults, plunger 282*a* may remain extended with joystick guide stuck in its closed position and the variable track joystick device 248 stuck in its first mode of operation. This can be dangerous as the work implements 130 of work vehicle 120 may be raised and carrying a load or in some other unsafe position that does not permit safe repair of the work vehicle fault. Therefore, variable track joystick device 248 can include failsafe mechanisms to enable an operator to force the joystick device 248 from its first mode of operation into its second mode of operation so that work implements 130 can be placed in a safe position and permit safe repairs on the work vehicle 120.

In one embodiment, one or more of linear tracks 406, 408 of joystick guide 280 can include a chamfered edge at the end of the track designed to engage with the rounded or chamfered tip of guide pin 310. An operator can manually force joystick device 248 into its second mode of operation by moving joystick handle 264 along the track until the rounded or chamfered tip of guide pin 310 engages the chamfered track edge. As the operator applies a force on the joystick handle 264 to push guide pin 310 against the end of the track, the angle and shape of the chamfer on the track edge and on the rounded or chamfered tip of guide pin 310 result in a downward force pushing the joystick guide 280 against solenoid plunger 282*a*. By applying sufficient force on joystick handle 264, the combined force of guide pin 310 and guide springs 412 downward on joystick guide 280 exceeds the force of solenoid plunger 282*a* and pushes joystick guide 280 down to its lowered, open position. Guide pin 310 and joystick guide 280 can be configured so that the operator's manipulation of joystick handle 264 can push joystick guide 280 to a lowermost position where joystick guide 280 actuates a microswitch severing the electrical connection to solenoid coil 282*b*. With the electrical connection to solenoid coil 282*b* severed, joystick guide 280 remains in its lowered, open position. Controller 258 determines from its sensors that joystick guide 280 in its open position and engages second mode algorithms for interpreting joystick position signals from joystick sensors 270. With variable track joystick device 248 configured to control FEL work implements, an operator retains sufficient control of the work vehicle to lower work implements 130 or otherwise move them into a safe position, to permit safe repair of any faults in work vehicle 120.

Figure 8:
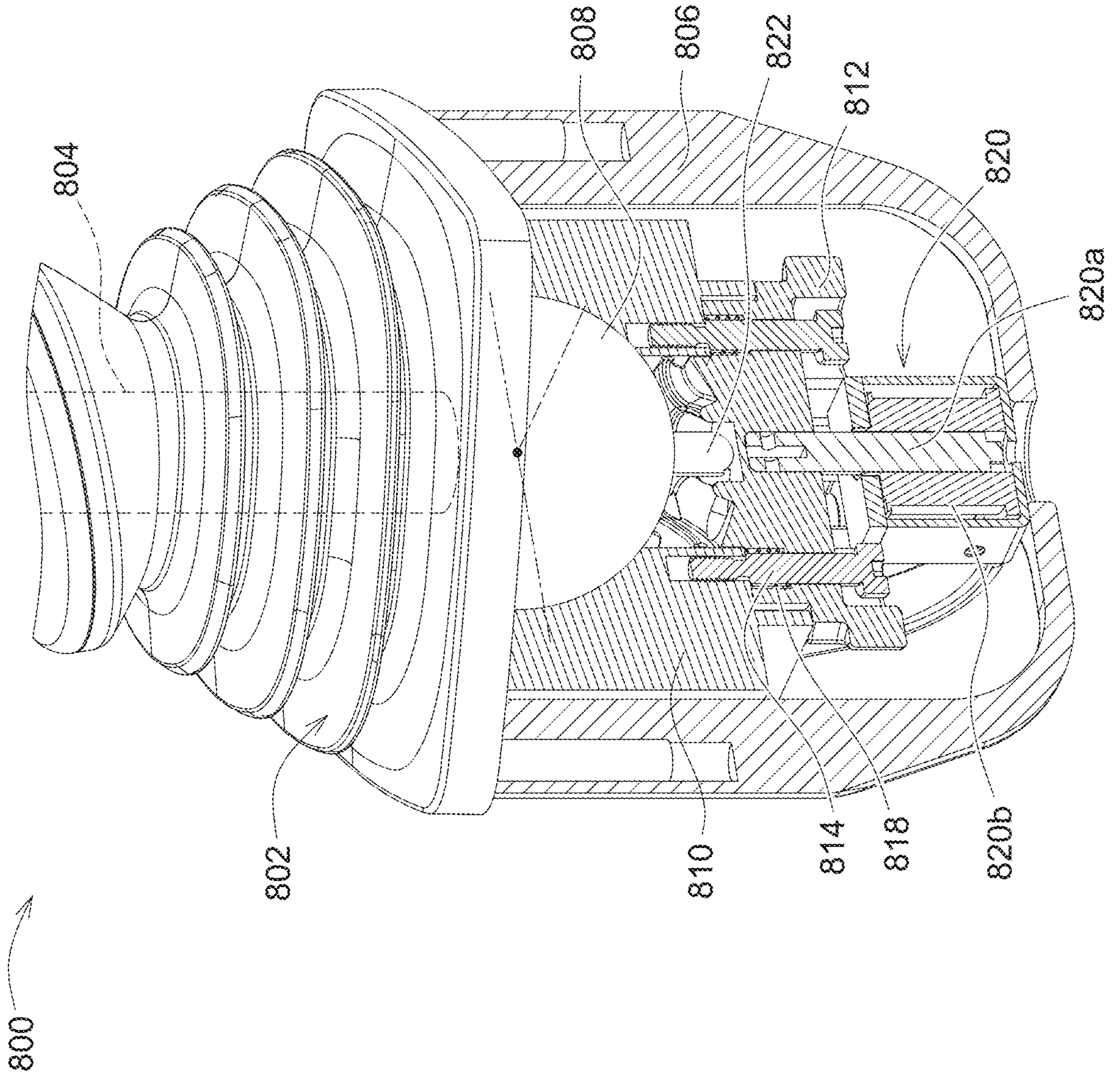
FIG. 8 is an isometric view of an alternative embodiment of a variable track joystick device showing the joystick guide and actuator in a closed position.

In an alternative embodiment of a variable track joystick device 800, shown in FIG. 8, variable track joystick device 800 can include joystick 802 mounted in a support housing 806. Joystick 802 has a joystick handle formed around structural member 804 that extends from joystick base 808. Unlike the joystick of FIGS. 7A, 7B that rotate on pivot shafts, joystick base 808 is a spheroid body that mates with a cavity in base mounting 810 to form a ball-and-socket joint and permits the joystick 802 to rotatably slide and pivot relative to based mounting 810. Because base mounting 810 is fixedly attached to support housing 806 the ball-and-socket mounting also permits joystick 802 to rotate and pivot relative to support housing 806. Joystick 802 includes a guide pin 822 that extends from joystick base 808 in a direction generally opposite to structural member 804 towards recesses or tracks in joystick guide 812. Joystick guide 812 is movably mounted on base mounting 810 with retaining pins or bolts 814 that permit joystick guide 812 to slide between an upper position and a lower position relative to the joystick base 808. Guide spring 818 biases joystick guide 812 to its lower position so that joystick guide 812 is pushed and remains in its lower position absent external forces that overcome guide spring 818. In this position, guide pin 822 remains outside and does not extend into the recesses or tracks of joystick guide 812. Variable track joystick device 800 can also include actuator 820. Actuator 820 can be an electrically powered solenoid with a plunger 820*a* which extends when solenoid coil 820*b* is energized. Actuator 820 can include a plunger spring that returns plunger 820*a* to its retracted position when solenoid coil is de-energized.

When solenoid coil 820*b* is energized, solenoid plunger 820*a* extends to push joystick guide into its upper position. In this position, guide pin 822 extends into the recesses or tracks in joystick guide 812 which restrict the movement of joystick 802 based on the shape of the tracks and movement is constrained to a first ROM. When solenoid coil 820*b* is de-energized, solenoid plunger 820*a* retracts and joystick guide 812 falls into its lower, open position. In this joystick guide position, guide pin 822 is raised above the joystick guide tracks and is unconstrained. Thus, in the open position of joystick guide 812, joystick 802 is free to move in a second ROM that is not constrained by joystick guide tracks. However, if variable track joystick device 800 experiences a fault and cannot de-energize solenoid coil 820*b* so that joystick guide is stuck in its upper, closed position, an operator can manually force joystick device 800 into its second mode of operation in the manner described in the previous embodiment.

Figure 9:
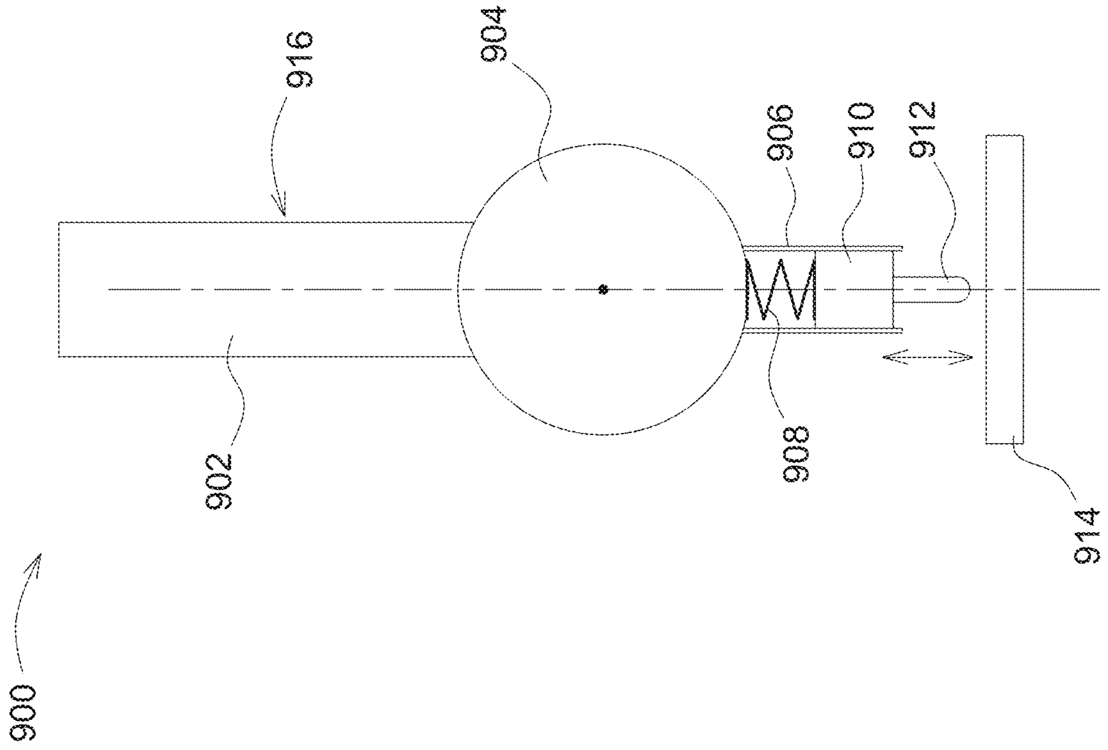
FIG. 9 is a schematic diagram of an alternative embodiment of a joystick with an integrated actuator.
Figure 10:
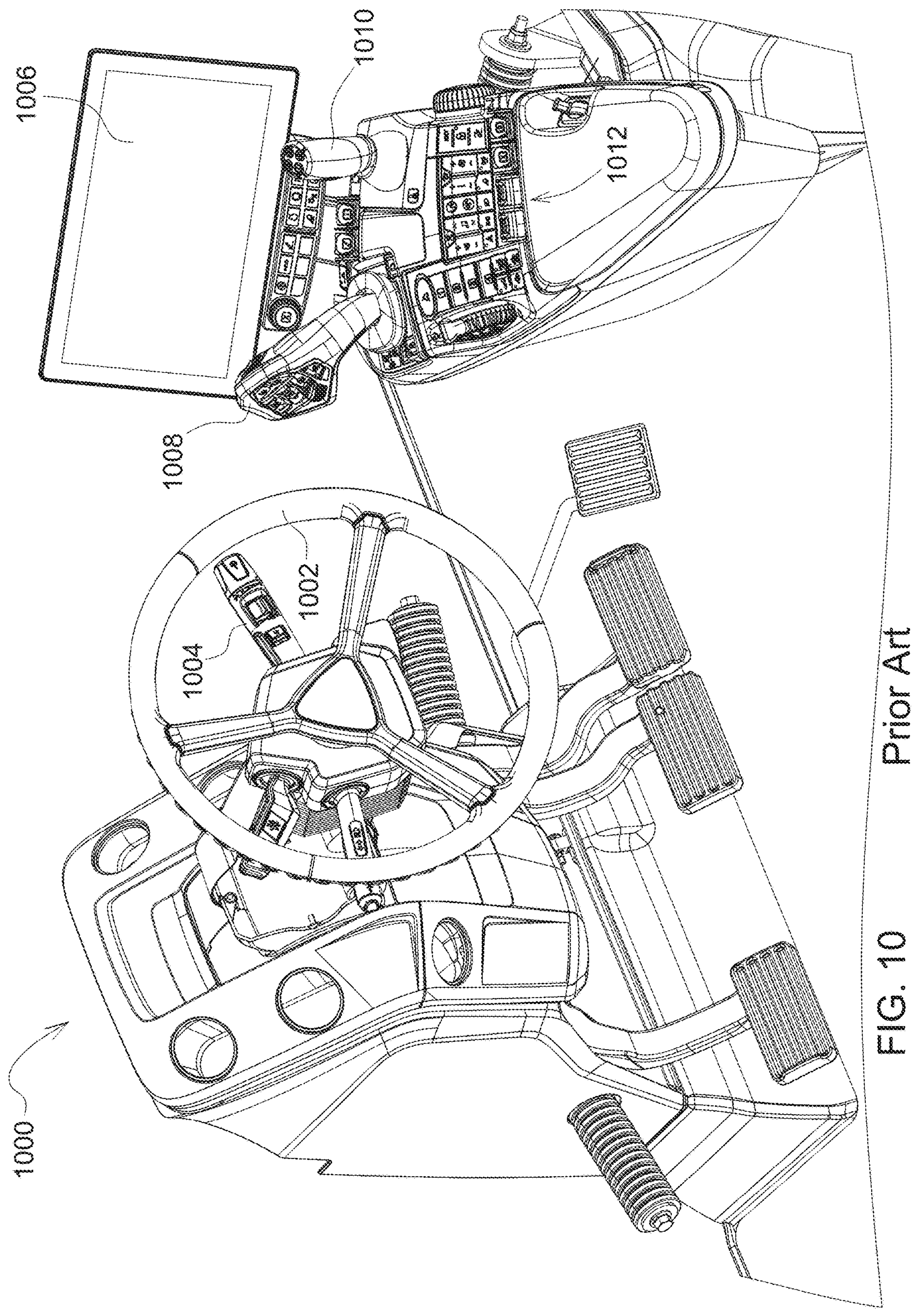
FIG. 10 Prior Art
FIG. 10 is a view of an operator station in the cabin of a prior art work vehicle.

As a further alternative embodiment of a variable track joystick device 900, shown schematically in FIG. 9, joystick 916 can include an integrated actuator coupled to move guide pin 912 between an upper position and a lower position. Joystick 916 can include joystick handle 902 that extends from joystick base 904. Guide pin housing 906 can extend from joystick base 904 in a direction generally opposite from joystick handle 902. An actuator can include an electrically powered solenoid coil 910 and a plunger can be mounted to slide between a lower standard position and an upper emergency position. Emergency spring 908 between joystick base 904 and solenoid coil 910 biases solenoid coil 910 to its lower, standard position in normal operation. Guide pin 912 can be integral with plunger so that energizing solenoid coil 910 extends plunger and guide pin 912. Variable track joystick device 900 also include joystick guide 914 which can be fixedly attached to the joystick device's support housing (not shown). Joystick guide 914 can include one or more tracks with one or more chamfered edge at the end of the track designed to engage with the rounded or chamfered tip of guide pin 912. In normal operation, emergency spring 908 biases solenoid coil 910 to its lower, standard position, and energizing solenoid coil 910 extends guide pin 912 downwards into recesses or tracks in joystick guide 914 to constrain the rotational movement of joystick 916 to a first ROM. Conversely, de-energizing solenoid coil 910 retracts guide pin 912 upwards, out of the recesses or tracks in joystick guide 914 to permit unconstrained rotational movement of joystick 916 to a second ROM.

However, if variable track joystick device 900 experiences a fault and cannot de-energize solenoid coil 910 so that guide pin 912 is stuck in its lower, closed position with a first ROM, an operator can manually force joystick device 900 into its second mode of operation. More specifically, the operator can manually force joystick device 900 into its second mode of operation by moving joystick handle 902 along the track until the rounded or chamfered tip of guide pin 912 engages a chamfered track edge. As the operator applies a force on the joystick handle 902 to push guide pin 912 against the end of the track, the angle and shape of the chamfer on the track edge and on the rounded or chamfered tip of guide pin 912 result in an upward force pushing the solenoid coil 910 against emergency spring 908. By applying sufficient force on joystick handle 902, the upward force of guide pin 912 on solenoid coil 910 exceeds the force of emergency spring 908 and pushes the entire actuator upwards to retract into guide pin housing 906 so that guide pin 912 is raised out of the tracks of joystick guide 914. A latch or similar mechanism in guide pin housing 906 can hold the actuator and guide pin 912 in this raised position which permits movement of joystick handle 902 in the second ROM.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims

What is claimed is:

1. A variable track joystick device utilized to control at least first and second work vehicle functions, the variable track joystick device comprising:

a support housing;

a joystick movably coupled to the support housing, the joystick having a lower joystick extension;

a joystick guide coupled to the support housing, the joystick guide and the lower joystick extension being movable relative to each other between a first position, which restricts joystick movement to a first range of motion relative to the joystick housing, and an second position, which permits joystick movement within a second range of motion that extends outside the first range of motion;

an actuator configured to move the joystick guide and the lower joystick extension to the first position relative to one another when the actuator is powered and to the second position when the actuator is not powered; and a controller configured to;

determine when the variable track joystick device is placed in a selected one of (i) a first mode in which joystick movement controls the first work vehicle function and (ii) a second mode in which joystick movement controls the second work vehicle function, command the actuator to move the joystick guide and lower joystick extension into the first position when the variable track joystick device is placed in the first mode, and into the second position when the variable track joystick device is placed in the second mode, and power the actuator when commanding the joystick guide and lower joystick extension into the first position, wherein the joystick is configured to push the joystick guide and lower joystick extension from the first position to the second position when the joystick moves from the first range of motion to the second range of motion when the actuator is powered.

2. The variable track joystick device of claim 1, wherein the first work vehicle function comprises a transmission control function, while the second work vehicle function comprises an implement control function.

3. The variable track joystick device of claim 2, wherein the implement control function comprises FEL control.

4. The variable track joystick device of claim 1, wherein the joystick guide includes a track pattern, wherein the lower joystick extension extends into the track pattern to restrict the joystick to the first range of motion in the first position, the track pattern including at least one linear track, and wherein the lower joystick extension is clear of the track pattern when the joystick guide is in the second position so that the joystick range of motion is unconstrained by the track pattern.

5. The variable track joystick device of claim 1, wherein the lower joystick extension is configured to engage the joystick guide to shift the joystick guide from the first position to the second position when the joystick moves from the first range of motion to the second range of motion.

6. The variable track joystick device of claim 1, wherein the joystick guide is coupled to support housing via at least one guide spring that biases joystick guide in the second position when first actuator is not powered.

7. The variable track joystick device of claim 1, wherein the joystick guide and lower joystick extension are configured to shift from the first position to the second position when the actuator is not powered.

8. The variable track joystick device of claim 1, wherein the first actuator includes an electric solenoid.

9. The variable track joystick device of claim 4, wherein the track pattern includes multiple intersecting tracks which each restrict joystick motion to at least one linear track whenever the joystick guide is in the first position.

10. The variable track joystick device of claim 1, wherein the joystick is rotatable relative to the support housing about a first rotational axis and about a second rotational axis perpendicular to the first rotational axis; and wherein the joystick guide restricts joystick movement to a first linear track and at least a second linear track perpendicular to the first linear track, respectively, whenever the joystick guide is in the first position.

11. The variable track joystick device of claim 10, wherein the first linear track and the second linear track intersect at a home position of the joystick.

12. The variable track joystick device of claim 1, further comprising a mode selection interface enabling an operator of the work vehicle to switch between the first and second modes; and wherein the controller determines when the variable track joystick device is placed in a selected one of the first and second modes based, at least in part, on operator input received via the mode selection interface.

13. A variable track joystick device utilized to control at least first and second work vehicle functions, the variable track joystick device comprising:

a support housing;

a joystick having a joystick base coupled to the support housing, wherein a guide pin extends from the joystick base, a joystick guide having a track pattern wherein the joystick guide is coupled to the support housing and is movable to a closed position in which guide pin extends into the track pattern to restrict joystick movement to a first range of motion, and is movable to an open position in which guide pin is clear of the track pattern so that joystick is unconstrained and can move withing a second range of motion;

a guide spring coupled between the joystick guide and the support housing, the guide spring being configured bias joystick guide towards its open position;

an actuator configured to move the joystick guide against the guide spring to its closed position when powered, and configured to retract the joystick guide to its open position when not powered; and a controller configured to:

determine when the variable track joystick device is placed in a selected one of (i) a first mode in which joystick movement controls the first work vehicle function and (ii) a second mode in which joystick movement controls the second work vehicle function;

command the joystick guide to the closed position when the variable track joystick device is placed in the first mode, and to the open position when the variable track joystick device is placed in the second mode;

provide power to the actuator when commanding the joystick guide to the closed position.

14. The variable track joystick device of claim 13, wherein the joystick is configured to move the joystick guide from its closed position to its open position by pushing guide pin against track pattern when the joystick is moved from the first range of motion to the second range of motion while the actuator is powered.

15. A work vehicle comprising:

a transmission;

a work implement; and a variable track joystick device, the variable track joystick device including:

a support housing;

a joystick having a lower joystick extension, the joystick being movable within in a first range of motion and within a second range of motion with respect to the support housing;

a joystick guide coupled to the support housing, the joystick guide being movable relative to the lower joystick extension between a closed position, which restricts joystick movement to a predetermined track pattern, and an open position, which permits joystick movement outside of the predetermined track pattern;

an actuator configured to move the joystick guide, relative to the lower joystick extension, to a closed position when powered, and configured to move the joystick guide relative to the lower joystick extension to an open position when not powered; and a controller configured to:

determine when the variable track joystick guide is placed in a selected one of (i) a first mode in which joystick movement controls a first work vehicle function and (ii) a second mode in which joystick movement controls a second work vehicle function;

command the joystick guide to the closed position when the variable track joystick device is placed in the first mode, and to the open position when the variable track joystick device is placed in the second mode; and provide power to the actuator when commanding the joystick guide to the closed position;

wherein the joystick is configured to move the joystick guide from its closed position to its open position when the joystick moves from the first range of motion to the second range of motion and the first actuator is powered.

16. The work vehicle of claim 15, wherein the joystick guide restricts joystick movement to multiple intersecting linear tracks when confining joystick movement to the predetermined track pattern.

17. The work vehicle of claim 15, wherein the work implement comprises a front end loader bucket, and wherein the work implement control mode comprises front end loader control.

* * * * *